(12) United States Patent
Long et al.

(10) Patent No.: US 11,654,736 B1
(45) Date of Patent: May 23, 2023

(54) AUXILIARY RIDING DEVICE, BALANCING SCOOTER AND AUXILIARY RIDING METHOD FOR THE BALANCING SCOOTER

(71) Applicant: Shenzhen Huixingchen Technology Co., Ltd., Guangdong (CN)

(72) Inventors: Wuming Long, Guangdong (CN); Feng Long, Guangdong (CN); Zewei Wei, Guangdong (CN)

(73) Assignee: SHENZHEN HUIXINGCHEN TECHNOLOGY CO., LTD., Guangdon (CN)

( * ) Notice: Subject to any disclaimer, the term of this patent is extended or adjusted under 35 U.S.C. 154(b) by 0 days.

(21) Appl. No.: 17/973,705

(22) Filed: Oct. 26, 2022

(30) Foreign Application Priority Data

Sep. 2, 2022 (CN) .......................... 202211071186.0
Sep. 9, 2022 (CN) .......................... 202211099598.5

(51) Int. Cl.
*B60G 3/14* (2006.01)
*B62K 11/00* (2006.01)

(52) U.S. Cl.
CPC .............. *B60G 3/14* (2013.01); *B62K 11/007* (2016.11)

(58) Field of Classification Search
CPC ................................ B60G 3/14; B62K 11/007
See application file for complete search history.

(56) References Cited

U.S. PATENT DOCUMENTS

| 2,974,741 A | * | 3/1961 | Witzmann | ......... | B62D 49/0621 |
| | | | | | 180/15 |
| 6,792,630 B1 | * | 9/2004 | Palmatier | ............. | A61G 7/0528 |
| | | | | | 280/43.17 |

FOREIGN PATENT DOCUMENTS

CN          1535854 A  * 10/2004  ............. B60G 17/00

* cited by examiner

*Primary Examiner* — Kevin Hurley
(74) *Attorney, Agent, or Firm* — Cooper Legal Group, LLC

(57) ABSTRACT

The present application relates to a technical field of a balancing scooter, particularly discloses an auxiliary riding device, a balancing scooter and an auxiliary riding method for the balancing scooter. The auxiliary riding device includes a mounting base, a stop block, a braking mechanism and an auxiliary mechanism; the auxiliary mechanism includes a swinging arm rotatably connected to the mounting base and an auxiliary member connected to the swinging arm; the swinging arm has a released state and a contraction state; the stop block has a locked state engaged with the swinging arm and an unlocked state separated from the swinging arm.

11 Claims, 14 Drawing Sheets

A

B-B

AUXILIARY RIDING DEVICE, BALANCING SCOOTER AND AUXILIARY RIDING METHOD FOR THE BALANCING SCOOTER

CROSS-REFERENCE TO RELATED APPLICATION

The present application claims the priority benefit of Chinese patent application 202211071186.0, filed on Sep. 2, 2022, and Chinese patent application 202211099598.5, filed on Sep. 9, 2022. The entireties of Chinese patent application 202211071186.0 and Chinese patent application 202211099598.5 are incorporated herein by reference and made a part of this specification.

TECHNICAL FIELD

This application relates to the technical field of balancing scooter, and in particular to an auxiliary riding device, a balancing scooter and an auxiliary riding method for the balancing scooter.

BACKGROUND

The operating principle of a balancing scooter is mainly based on a basic principle called Dynamic Stabilization, detecting the changes of vehicle attitudes by use of gyroscope and acceleration sensors inside the vehicle body, and driving the motor precisely to adjust accordingly by use of a servo control system to maintain balance of the system.

In an one-wheeled balancing scooter, the wheel is located in the middle of the whole body, and a pedal is provided at each of the two sides of the wheel; during the riding and driving of this kind of one-wheeled balancing scooter, the balance of the pedals on both sides needs to be ensured, therefore, the demand of a user' sense of balance is relatively high, especially for beginners, it is not easy to master the balance of the vehicle body.

SUMMARY

In order to facilitate a user to balance the vehicle body faster during riding, the present application provides an auxiliary riding device, a balancing scooter and an auxiliary riding method for the balancing scooter.

In a first aspect, the present application provides an auxiliary riding device, adopting the following technical solutions:

an auxiliary riding device, including:
a mounting base, which is provided to be connected with a balancing scooter;
a stop block, which is slidably provided on the mounting base; wherein an engagement notch is provided on the stop block, and the stop block has a locked state and an unlocked state on the mounting base;
a braking mechanism, which is provided to be connected with the balancing scooter; wherein the braking mechanism has a connecting block; the connecting block is connected with the stop block for driving the stop block to move, making the stop block is switched between the locked state and the unlocked state;
an auxiliary mechanism, including a swinging arm rotatably connected to the mounting base and an auxiliary member connected to the swinging arm; an engagement step groove that fits with the engagement notch is provided on the swinging arm; and the swinging arm has a released state and a contraction state;

the locked state of the stop block is configured for keeping the swinging arm in the released state, to make the auxiliary member act as an auxiliary support to the balancing scooter; when the swinging arm is switched from the released state to the contraction state, the swinging arm simultaneously drives the stop block to be switched from the locked state to the unlocked state.

Based on the technical solution mentioned above, the auxiliary riding device may be mounted to an actuator by use of the mounting base, and the auxiliary mechanism and the stop block on the mounting base are matched with each other to achieve different states of the swinging arm; when the actuator needs to be supported, the swinging arm is in the released state; and in the released state, a supporting angle is formed between the opening of the swinging arm and the mounting base, which plays a supporting role on the actuator. When the support of auxiliary mechanism is not needed, the braking mechanism is used to drive the stop block away from the restriction of the auxiliary mechanism, switching the swinging arm to the contraction state; in the state of the contraction state, the swinging arm fits with the mounting base, which may avoid the auxiliary mechanism from bumping and effecting the normal driving. The locking state of the stop block may be maintained by the braking mechanism, which in turn maintains the released state of the swinging arm and the swinging arm may trigger the braking mechanism to switch the stop block from the locking state to the to-be-unlocked state.

In some embodiments, the mounting base has a rotation supporting part; the swinging arm is rotatably connected to the rotation supporting part; and the rotation supporting part has a first sloping surface and a second sloping surface;

when the swinging arm is in the contraction state, the swinging arm is adjacent to the first sloping surface;

when the swinging arm is in the released state, the swinging arm is adjacent to the second sloping surface, and a swinging gap is provided between the swinging arm and the second sloping surface for swinging of the swinging arm; when the swinging arm fits with the second sloping surface, the swinging arm triggers the braking mechanism to put the stop block in a to-be-unlocked state.

Based on the technical solution mentioned above, the swinging arm is located at different positions of the rotation supporting part in the contraction state and the released state; when the swinging arm fits with the stop block, the swinging arm is close to the first sloping surface. When the swinging arm needs to be switched from the released state to the contraction state, the swinging arm rotates towards the swinging gap and fits with the second sloping surface, at this time, since the stop block and the swinging arm are fitted with each other, the swinging arm may push the stop block to further trigger the braking mechanism and switch the braking mechanism from the to-be-unlocked state to the unlocked state.

In some embodiments, the stop block has a first abutting surface; the engagement step groove has an engagement surface and a second abutting surface; when the stop block is in the locked state, the first abutting surface fits with the second abutting surface, so that when the swinging arm moves towards the swinging gap, the swinging arm drives, with the second abutting surface, the stop block to move.

Based on the technical solution mentioned above, when the stop block and the swinging arm are engaged with each other, the first abutting surface abuts against the second abutting surface; during the rotation of the swinging arm, the second abutting surface of the swinging arm may abut against the first abutting surface of the stop block to drive the stop block to move and switch the stop block in different states; such a configuration may make the swing arm and the stop block work better together.

In some embodiments, a resetting member is provided at the joint between the swinging arm and the rotation supporting part for switching the swinging arm from the released state to the contraction state.

Based on the technical solution mentioned above, when the stop block is switched into the unlocked state, the swinging arm is free from the restriction of the stop block; under the action of the resetting member, the swinging arm is able to be returned back to the contraction state, to achieve the automatic switching of the swinging arm from the releasing state to the contraction state and facilitate to switch the states of the swinging arm.

In some embodiments, a spindle is provided on the mounting base; the swinging arm is rotatably connected to the mounting base with the spindle; the resetting member is provided as a torsion spring; the torsion spring has a first end and a second end; and the torsion spring is sleeved on the spindle;

a placing groove and a notch are provided on the swinging arm; the torsion spring is provided inside the placing groove; a limiting groove is provided on the rotation supporting part; the first end is engaged with the placing groove; the second end extends to the limiting groove through the notch; when the swinging arm is in the contraction state, the torsion spring is in a non-stressed state.

Based on the technical solution mentioned above, the configuration of the torsion spring, when the swinging arm is not limited by the stop block, the swinging arm may be returned to the contraction state under the elastic potential energy of the torsion spring. The torsion spring is provided in the placing groove, and one end of the torsion spring abuts against the placing groove and the other end of the torsion spring abuts against the limiting groove on the mounting base, both the placing groove and the limiting groove play a limiting role on the torsion spring; when the swinging arm is in the released state, i.e., the stop block is in the locked state and the torsion spring is in the pressed state, so that when the stop block is in the locked state, under the rotary force, the swinging arm may be automatically reset.

In some embodiments, the braking mechanism includes:
a mounting box, which is mounted on the balancing scooter; and an opening is provided on one side of the mounting box;

a movable block, which is slidably provided in the mounting box; the movable block has a connecting part, a locking part, a resetting part and a buckling part; the connecting part is slidably connected to an inner wall of the mounting box; the buckling part passes through the opening and extends to an outer side of the mounting box; a connecting block is connected to the buckling part; and the connecting block is fixedly connected to the stop block;

a resetting spring, wherein an end of the resetting spring abuts against the inner wall of the mounting box, and other end of the resetting spring abuts against the resetting part;

an elastic hook, wherein the elastic hook has a fixing end and an engagement end, the fixing end is fixed in the mounting box; and the engagement end is engaged with the locking part.

Based on the technical solution mentioned above, the movable block is slidably connected to the mounting box and is fixedly positioned at a certain position of the mounting box under the actions of the resetting member and the elastic hook; the elastic hook fits with the locking part of the movable block, playing a limiting role on the movable block and therefore limiting the movable block in different sliding states. When the movable block is in different sliding states, the movable may drive the stop block to move with the connecting block, so as to make the stop block and the swinging arm work together.

In some embodiments, the locking part is provided with a first limiting step, a second limiting step and a guiding limiting block sequentially along the vertical direction;

the first limiting step has a first engagement slope, and the first engagement slope extends to a side of the connecting part;

the second limiting step has a first guiding slope and a second engagement slope;

the guiding limiting block has a second guiding slope;

a switching channel is provided between both of the second limiting step and the guiding limiting block and an inner wall of the connecting part, for the elastic hook to be engaged with the first limiting step and the second limiting step respectively through the switching channel under actions of the first engagement slope, the first guiding slope, the second engagement slope and the second guiding slope.

Based on the technical solution mentioned above, when the elastic hook is engaged with the first limiting step and the second limiting step respectively, the elastic hook is able to relatively fix the position of the movable block. By use of the switching channel between the second limiting step and the guiding limiting block and the connecting part, the elastic hook is able to be switched between the first limiting step and the second limiting step.

In some embodiments, the auxiliary member is an auxiliary wheel; the auxiliary wheel is rotatably connected to the swinging arm for making the swinging arm abut against ground when the swinging arm is in a released state;

based on the technical solution mentioned above, when the swinging arm is in the released state, the auxiliary wheel abuts against the ground, the auxiliary wheel is rotatably connected to the swinging arm, not only playing a supporting role on the actuator and changing the sliding friction to rolling friction so that the auxiliary wheel may rotate simultaneously with the actuator.

and/or, a cushion is connected to the mounting base; when the swinging arm is in the contraction state, the cushion abuts against the swinging arm;

based on the technical solution mentioned above, when the swinging arm returns to the contraction state under the action of the resetting member, the cushion may play a cushioning role and avoid the swinging arm to bump with the mounting base or the actuator.

In a second aspect, the present application provides a balancing scooter, which adopts the following technical solution:

A balancing scooter, including:
a frame;
a wheel, which is rotatably connected to the middle of the frame along the length direction of the frame;
the auxiliary riding device mentioned above is connected to the bottom of the frame.

Based on the technical solution mentioned above, the auxiliary riding device mentioned above is mounted on the frame, playing a supporting role during the user's riding on the balancing scooter, to reduce the inclining angle of the frame and facilitate the user to keep the balance of the overall frame quickly. Before riding, the swinging arm in the auxiliary riding device is opened and the swinging arm is in the released state, at this time, the auxiliary member abuts against the supporting plane. After the user boards on the balancing scooter, the swinging arm may be switched from the released state to the to-be-contracted state, and then automatically switched from the to-be-contracted state to the contraction state; the swinging arm contracts after the overall frame keeps balance, to avoid the auxiliary mechanism from bumping with the bulges on the ground and ensure the smooth operation of the balancing scooter.

In a third aspect, the present application provides an auxiliary riding method for the balancing scooter, adopting the following technical solution:

including the following steps:

rotating the swinging arm to put the swinging arm in the released state, making the auxiliary member contact with a supporting plane;

applying a first pressure to a side of the frame such that the first pressure is applied to the swinging arm and the auxiliary member;

applying a second pressure to other side of the frame;

releasing the first pressure from the swinging arm and the auxiliary member to switch the swinging arm from the released state to the contraction state.

In summary, the present application includes at least one of the following beneficial technical effects:

1. the auxiliary riding device may play a supporting role during the riding of a beginner; opening the swinging arm of the auxiliary riding device before riding to put the swinging arm in the released state, at this time, the auxiliary member abuts against the supporting plane to reduce the inclining angle of the frame, so as to facilitate the beginner to keep the balance of the overall frame quickly;

2. after the user boards on the balancing scooter, the swinging arm is switched, by the braking mechanism, from the released state to the to-be-contracted state, and then is automatically switched from the to-be-contracted state to the contraction state; when the overall frame keeps balance, the swinging arm is contracted to avoid the auxiliary mechanism from bumping with the bulges on the ground to ensure the smooth operation of the balancing scooter.

DESCRIPTION OF THE EMBODIMENTS

The present application will be further described below with reference to FIGS. 1-21.

In a first aspect, an embodiment of the present application discloses an auxiliary riding device.

Figure 1:
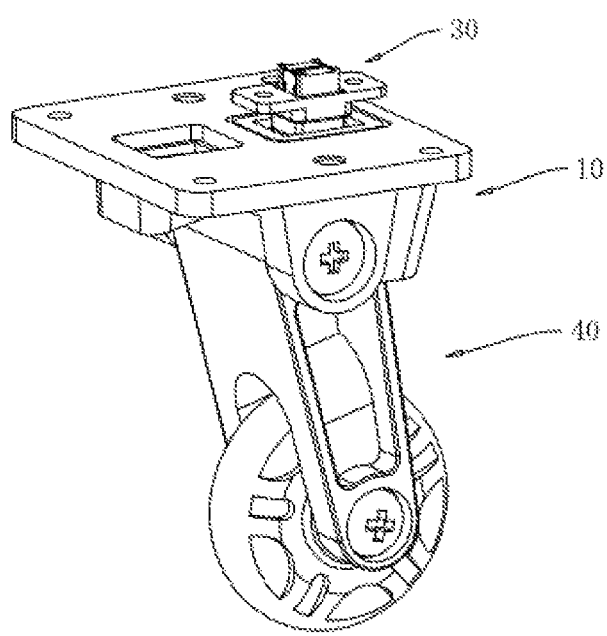
FIG. 1 shows a schematic diagram of a three-dimensional structure of an auxiliary riding device in an embodiment of the present application.
Figure 2:
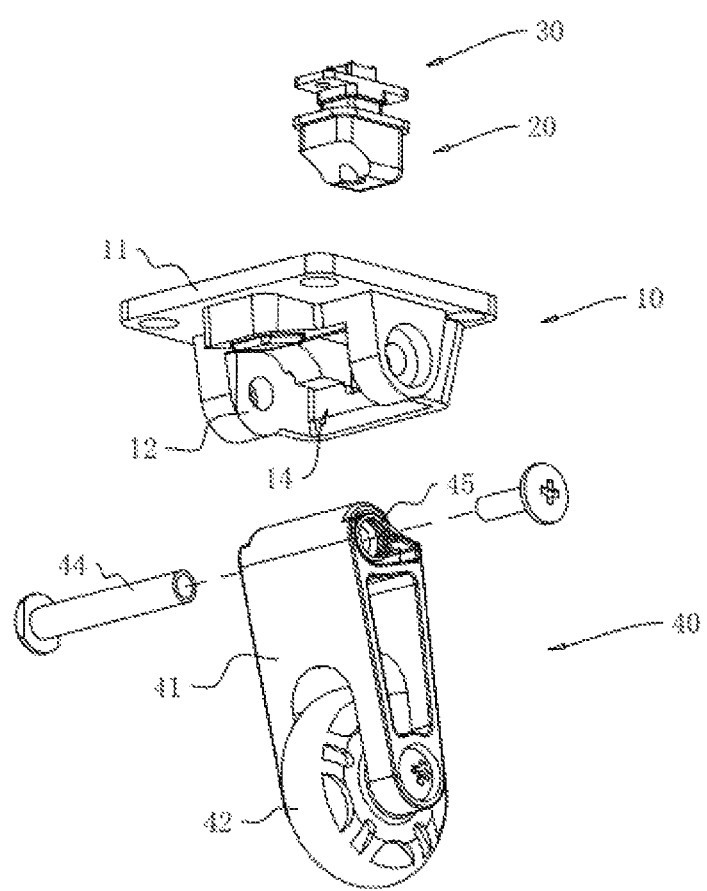
FIG. 2 shows an explosion schematic diagram of a structure of the auxiliary riding device in an embodiment of the present application.

Referring to FIGS. 1 and 2, the auxiliary riding device includes a mounting base 10, a stop block 20, a braking mechanism 30 and an auxiliary mechanism 40. The mounting base 10 and the braking mechanism 30 are configured to be mounted on a balancing scooter or other similar vehicles. The mounting base 10, as a basic connecting member of the auxiliary riding device, may be fixedly or detachably connected with a vehicle, and may be disassembled or assembled based on a user's different usages. The stop block 20 and the auxiliary mechanism 40 may be movably arranged on the mounting base 10. The braking mechanism 30 may drive the stop block 20 to move so that the stop block 20 cooperates with the auxiliary mechanism 40 to change different auxiliary states of the auxiliary mechanism 40.

Figure 3:
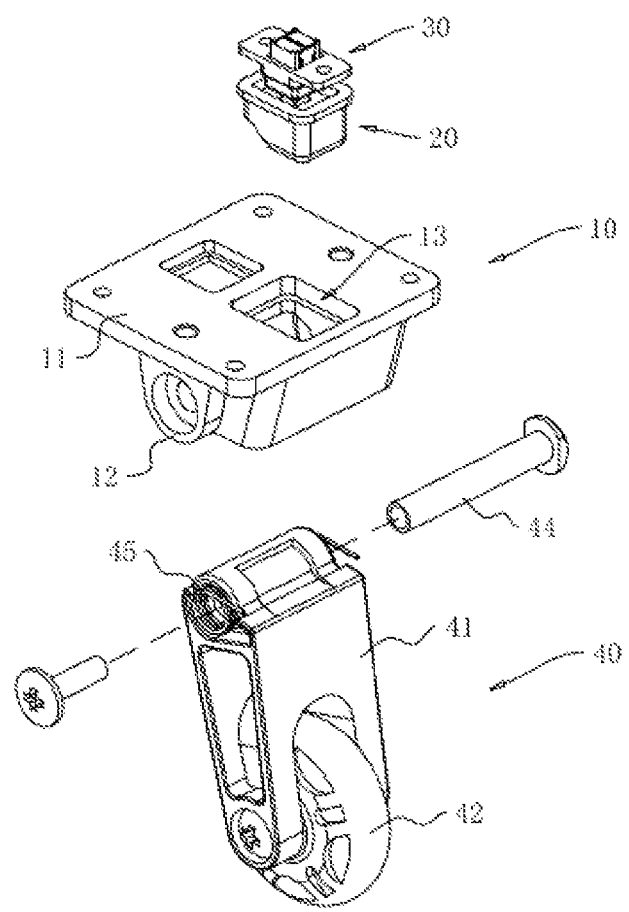
FIG. 3 shows a schematic diagram of structures in FIG. 2 from a different view.

Referring to FIGS. 2 and 3, the mounting base 10 includes a mounting part 11 and a rotation supporting part 12, which are integrally formed together.

Figure 4:
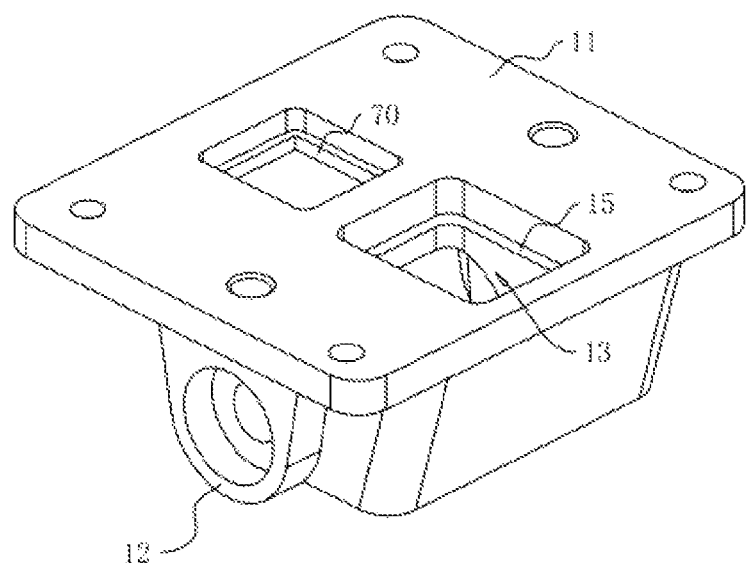
FIG. 4 shows a schematic diagram of detailed structures of the auxiliary riding device in an embodiment of the present application, mainly for showing structures of a mounting base.
Figure 5:
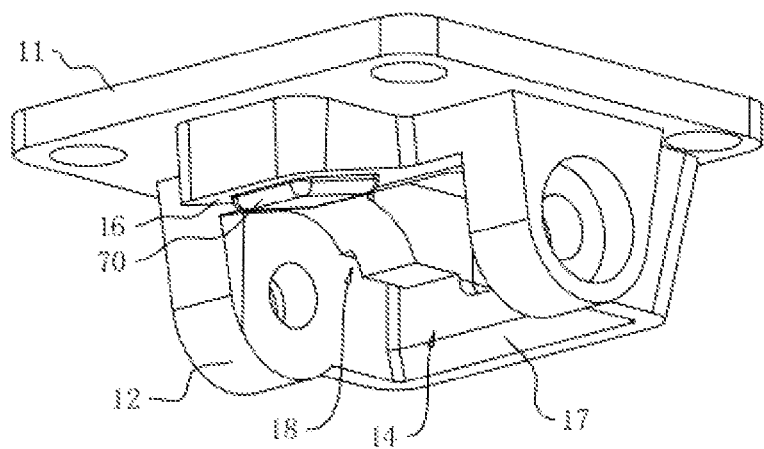
FIG. 5 shows a schematic diagram of structures in FIG. 4 from a different view.

Referring to FIGS. 4 and 5, a mounting slot 13 is provided on the mounting part 11 and the rotation supporting part 12. A holding slot 14 is provided within the rotation supporting part 12, and the mounting slot 13 is communicated with the holding slot 14. A first step surface 15 is provided in the mounting slot 13. The stop block 20 is slidably connected with the mounting slot 13, and the stop block 20 may pass through the mounting slot 13 and extend into the holding slot 14 to match with the auxiliary mechanism 40.

Referring to FIG. 5, the rotation supporting part 12 includes a first sloping surface 16 and a second sloping surface 17; the first sloping surface 16 is arranged roughly opposite to the second sloping surface 17; and the first sloping surface 16 is closer to the mounting part 11 than the second sloping surface 17.

Figure 6:
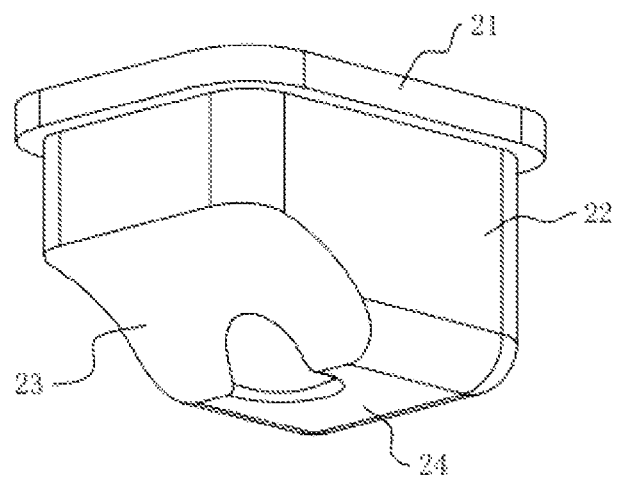
FIG. 6 shows a schematic diagram of detailed structures of specific features of the auxiliary riding device in an embodiment of the present application, mainly for showing structures of a stop block.

Referring to FIG. 6, the stop block 20 includes a step limiting part 21 and an engagement part 22. A lower end surface of the step limiting part 21 may engage with the first step surface 15 to limit the stop block 20. An engagement notch 23 is provided on the engagement part 22 and the engagement notch 23 is arc-shaped. Under the action of the braking mechanism 30, the stop block 20 has a locked state, an unlocked state and a to-be-unlocked state on the mounting base 10.

The locked state is a state that the stop block 20 is extended from the mounting slot 13 and in the locked state, the step limiting part 21 of the stop block 20 abuts against the first step surface 15; the unlocked state is a state that the stop block 20 is retracted into the mounting slot 13 and in the unlocked state, the step limiting part 21 of the stop block 20 is separated from the first step surface 15; and the to-be-unlocked state is a transition state from the block state to the unlocked state.

Figure 7:
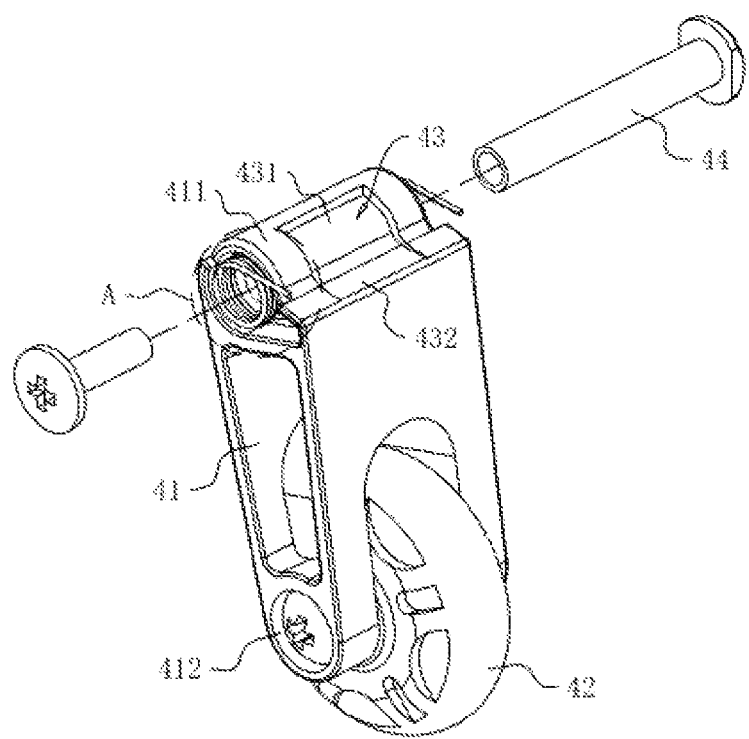
FIG. 7 shows an explosion schematic diagram of a structure of an auxiliary mechanism of the auxiliary riding device in an embodiment of the present application.

Referring to FIG. 7, the auxiliary mechanism 40 includes a swinging arm 41 which is rotatably connected to the holding slot 14 and an auxiliary member 42; the swinging arm 41 has a hinge end 411 and a supporting end 412. In some embodiments, the auxiliary member 42 is configured as an auxiliary wheel body, and the auxiliary wheel body is rotatably connected on the supporting end 412 for contact with a supporting surface; the supporting surface may be the ground, floor or other supporting surface for supporting the actuator to move along. In some embodiments, the auxiliary member 42 may also be configured as an auxiliary sphere, an auxiliary ball or other structures.

Referring to FIG. 7, an engagement step groove 43 is provided at the hinge end 411 of the swinging arm 41, the opening of the engagement step groove 43 faces towards the mounting slot 13; the engagement notch 23 on the stop block 20 is able to be engaged into the engagement step groove 43, to limit and fix the swinging arm 41. The swinging arm 41 on the mounting base 10 has a release state, a contraction state and a to-be-contracted state.

Wherein, the contraction state means a state that the swinging arm 41 closes to the first sloping surface 16 on the mounting base 10, and at this time, the stop block 20 may not limit the movement of the swinging arm 41; i.e., when the swinging arm 41 is in the contraction state, the stop block 20 is in the unlocked state; the release state means a state that the swinging arm 41 closes to the second sloping surface 17 on the mounting base 10, and at this time, the engagement notch 23 on the stop block 20 is engaged into the engagement step groove 43 on the swinging arm 41; i.e., when the swinging arm 41 is in the release state, the stop block 20 is in the locked state; the to-be-contracted state means that one side of the swinging arm 41 is fitted to the second sloping surface 17, and at this time, the hinge end 411 of the swinging arm 41 abuts against the stop block 20, to change the stop block 20 from the locked state into the unlocked state, i.e., when the swinging arm 41 is in the to-be-contracted state, the stop block 20 is in the to-be-unlocked state.

Figure 9:
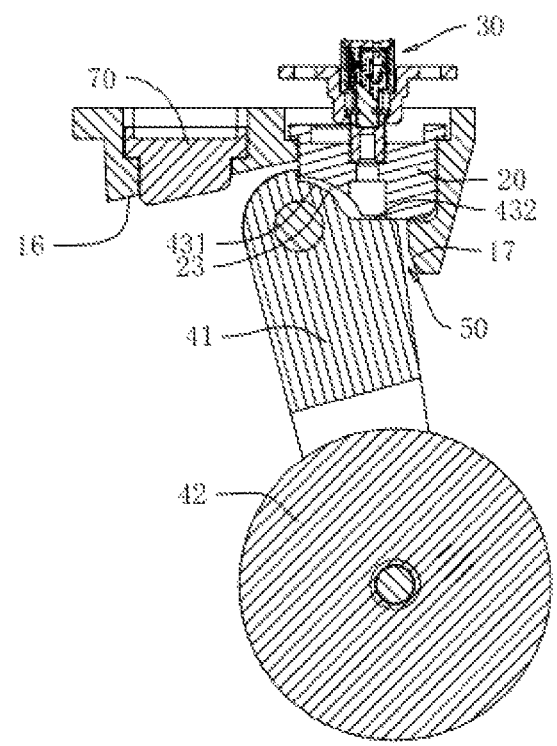
FIG. 9 shows a sectional view of an overall structure of the auxiliary riding device in an embodiment of the present application.

Referring to FIG. 9, when the swinging arm 41 is in the release state, a swinging gap is provided between one side of the swinging arm 41 and the second sloping surface 17, and the swinging gap 50 is configured for providing a space for the swinging arm 41 to rotate when the swinging arm 41 is engaged into the stop block 20.

Referring to FIGS. 7 and 9, since the swinging arm 41 and the stop block 20 switch between different states, a relatively high degree of precision is required for the fit between the swinging arm 41 and the stop block 20. The engagement step groove 43 has an engagement surface 431 and a second abutting surface 432, and the shape of the engagement surface 431 is roughly the same as that of the engagement notch 23 to make the stop block 20 to be engaged into the engagement step groove 43 more effectively.

Referring to FIGS. 7 and 9, the engagement surface 431 is connected with the second abutting surface 432, and the joint connection between the engagement surface 431 and the second abutting surface 432 is a recessed circular transition surface; such a configuration may provide a certain gap between the circular transition surface and the engagement notch 23 when the stop block 20 abuts to the swinging arm 41, to prevent jamming and facilitate to swinging arm 41 to rotate. Referring to FIG. 6, the stop block 20 has a first abutting surface 24, and when the stop block 20 and the swinging arm 41 are engaged with each other, the first abutting surface 24 abuts against the second abutting surface 432, to facilitate the stop block 20 to be abutted against the swinging arm 41 when the swinging arm 41 is rotated so that the stop block 20 may move with the swinging arm 41 simultaneously.

When the swinging arm 41 is needed to be transmitted from the release state to the contraction state, the swinging arm 41 is needed to be rotated first to make the swinging arm 41 to move towards the direction of the swinging gap 50 until the swinging arm 41 is fitted to the second sloping surface 17, and at this time, the swinging arm 41 is in the contraction state and the stop block 20 is in the to-be-unlocked state.

Referring to FIG. 7, a spindle 44 is fixedly connected to the holding slot 14; the hinge end 411 of the swinging arm 41 rotatably sleeves the spindle 44; a resetting member is provided at the connective position between the swinging arm 41 and the holding slot 14. In this embodiment, the resetting member preferably adopts torsion springs 45 and the torsion springs 45 sleeve the spindle 44; a torsion spring 45 is provided at each of the two ends of the rotation axis of the swinging arm 41, i.e., two torsion springs 45 are provided.

Figure 8:
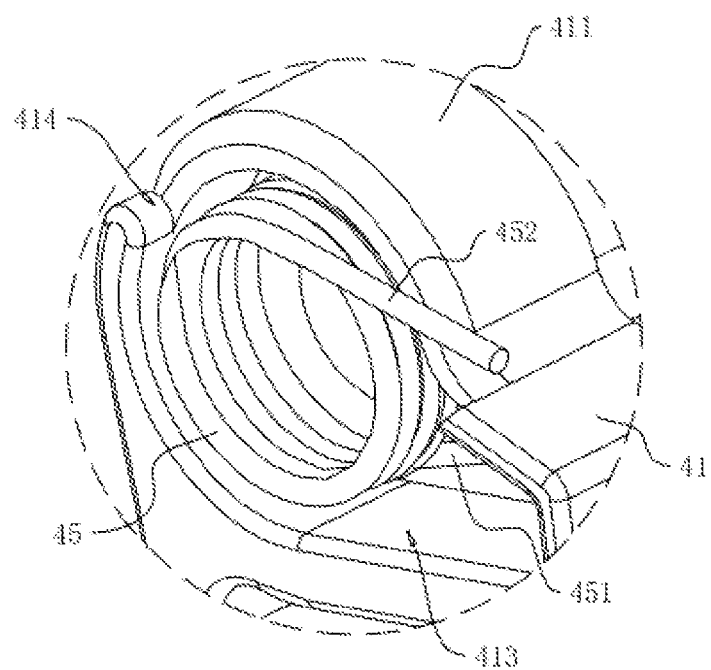
FIG. 8 shows an enlarged schematic diagram of part A in FIG. 7.

Referring to FIGS. 7 and 8, a placing groove 413 and a notch 414 are provided at the hinge point of each of the both sides of the swinging arm 41; the placing groove 413 is communicated with the notch 414; and the torsion springs 45 are provided in the placing grooves 413 respectively. Referring to FIG. 5, two limiting grooves 18 are provided at the rotation supporting part 12 of the mounting base 10; and the positions of the limiting grooves 18 correspond to those of the two torsion springs 45.

Referring to FIGS. 5 and 8, a torsion spring 45 has a first end 451 and a second end 452; the first end 451 is engaged by the inner wall of the placing groove 413; and the second end 452 passes through the notch 414 and extends to the limiting groove 18.

When the torsion springs 45 are in a non-stressed state, the swinging arm 41 is in the contraction state. I.e., when the stop block 20 is switched from the to-be-unlocked state to the unlocked state, and under the torque of the torsion springs 45, the swinging arm 41 is reset to the contraction state.

In some embodiments, the resetting member may also be other plastic members, and the elasticity of the plastic member is able to apply a rotary force to the swinging arm 41 to keep the swinging arm 41, without the rotary force, in the contraction state.

Figure 10:
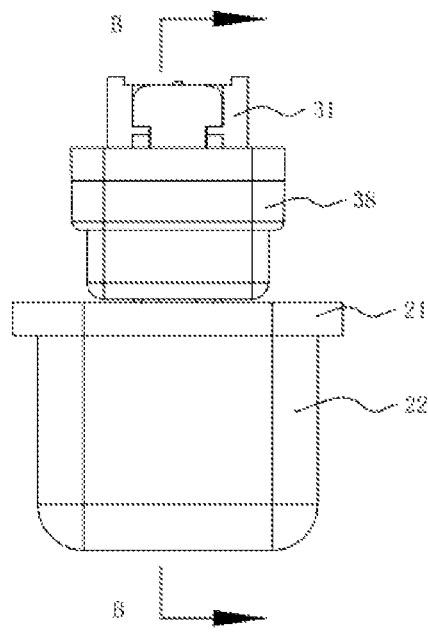
FIG. 10 shows a side view of the auxiliary riding device in an embodiment of the present application.
Figure 11:
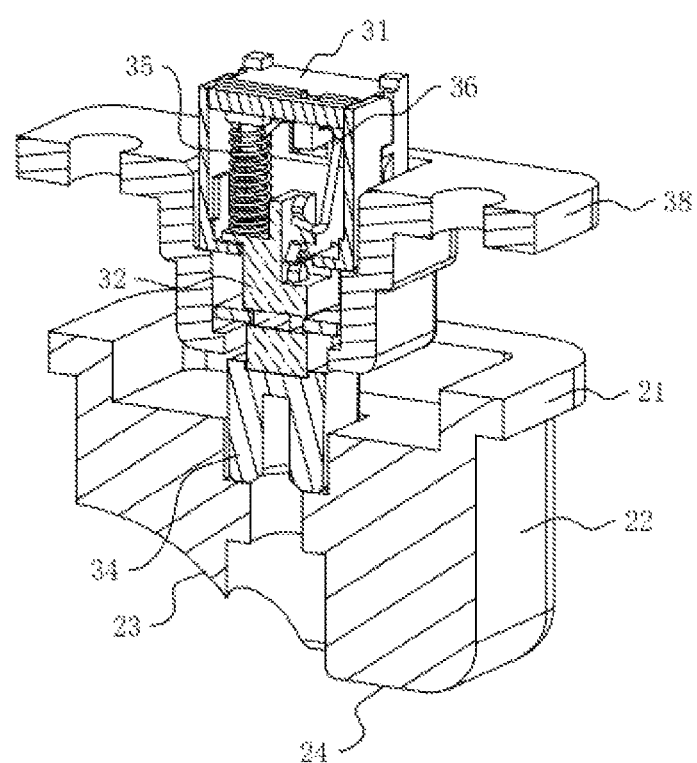
FIG. 11 shows a schematic diagram of three-dimensional structures from B-B section in FIG. 10.

Referring to FIGS. 10 and 11, as a preferable solution of this embodiment, the braking mechanism 30 includes a mounting box 31 which is configured for connecting with the actuator, and a movable block 32 which is slidably provided in the mounting box 31. The braking mechanism 30 further includes a fixing base 38, and the fixing base 38 is mounted on the actuator to provide a fixed function for the mounting box 31.

Figure 12:
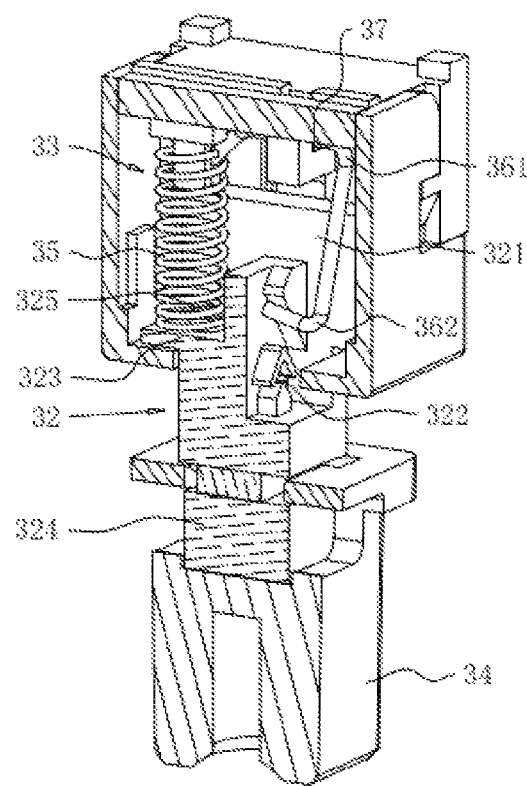
FIG. 12 shows a schematic diagram of a specific structure of a braking mechanism in an embodiment of the present application.

Referring to FIGS. 11 and 12, a mounting cavity 33 is provided in the mounting box 31; an opening is provided on a side of the mounting box 31; the movable block 32 is attached in the mounting cavity 33 and extends to the outside of the mounting box 31 through the opening.

Figure 13:
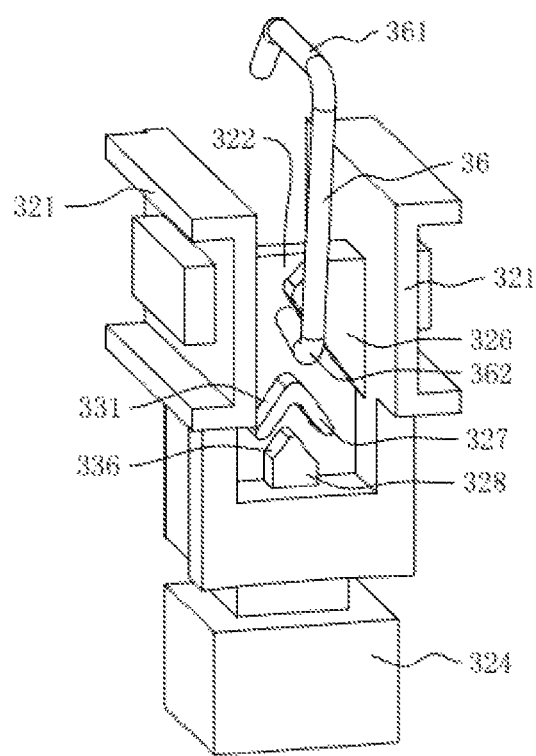
FIG. 13 shows a schematic diagram of three-dimensional structures of a movable block and an elastic hook in an embodiment of the present application.

Referring to FIGS. 12 and 13, the movable block 32 includes a connecting part 321, a locking part 322 and a resetting part 323 and a buckling part 324; the connecting part 321 is slidably connected to the inner wall of the mounting box 31; the buckling part 324 extends outside of the mounting box 31 and a connecting block 34 is fixedly connected to the buckling part 324; the connecting block 34 is connected with the stop block 20 so that the movable block 32 is able to drive the stop block 20 to move simultaneously.

Referring to FIGS. 11 and 12, the braking mechanism 30 further includes a driving unit which is configured for driving the movable block 32 to make reciprocal movement; the driving unit includes a resetting spring 35 and an elastic hook 36, both of which are configured in the mounting cavity 33; one end of the resetting spring 35 abuts against the top wall of the mounting box 31, and the other end of the resetting spring 35 abuts against the resetting part 323 of the movable block 32; limiting posts 325 are provided on both the mounting box 31 and the resetting part 323 and the limiting posts 325 are sleeved by the resetting spring 35.

Referring to FIG. 12, the elastic hook 36 has a fixing end 361 and an engagement end 362, a limiting hole 37 is provided at the top of the mounting box 31; the fixing end 361 of the elastic hook 36 passes through the limiting hole 37 to be fixed in the mounting box 31; the engagement end 362 of the elastic hook 36 extends downwards to the locking part 322 of the movable block 32. The elastic hook 36 may be made of any of carbon spring steel, alloy spring steel stainless spring steel or other similar materials, making the elastic hook 36 has a certain elastic deformation property and a certain hardness.

Referring to FIG. 13, the locking part 322 is provided with a first limiting step 326, a second limiting step 327 and a guiding limiting block 328 successively from top to bottom.

Figure 14:
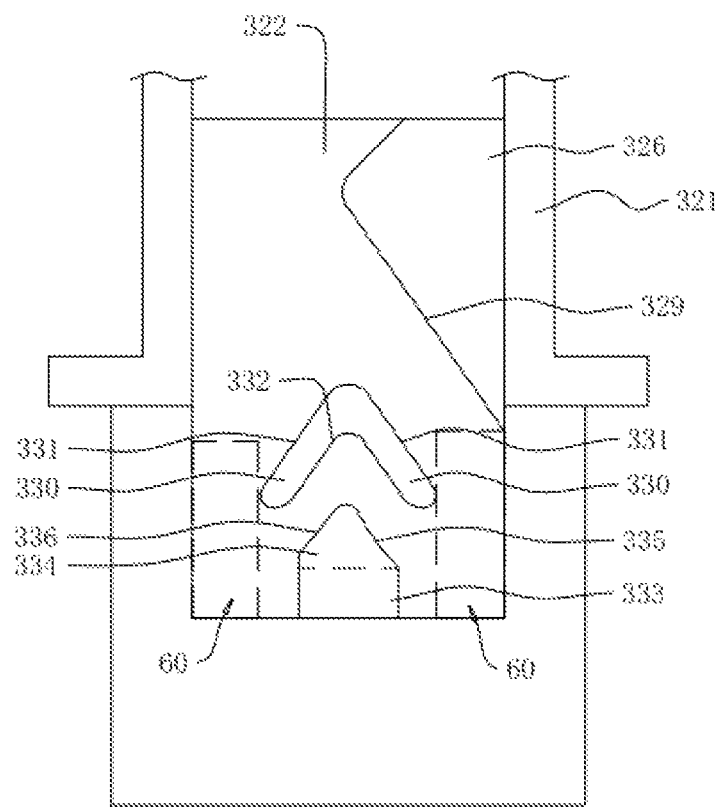
FIG. 14 shows a side view of a partial structure of a movable block in an embodiment of the present application, mainly for showing detailed features of a locking part of a movable block.

Referring to FIGS. 13 and 14, the first limiting step 326 extends from the inner side of the connecting part 321 to the middle of the locking part 322; the first limiting step 326 has a first engagement slope 329, and the first engagement slope 329 gradually slopes downward from the middle of the locking part 322 to the inner wall of the connecting part 321.

Referring to FIGS. 13 and 14, both the second limiting step 327 and the guiding limiting block 328 are provided in the middle of the width direction of the locking part 322; two switching channels 60 are provided between both of the second limiting step 327 and the guiding limiting block 328, and the inner wall of the connecting part 321, which are configured for the elastic hook 36 to move; i.e., the elastic hook 36 may be engaged in the first limiting step 326 or the second limiting step 327 through the switching channels 60.

Referring to FIGS. 13 and 14, the second limiting step 327 is spaced from the first limiting step 326. The second limiting step 327 has two symmetrically provided limiting parts 330; each of the two limiting parts 330 has a connecting end and an opening end, and the connecting ends of the two limiting parts 330 are connected with each other to form a V-shaped structure with a downward opening; a side of each of the limiting parts 330 close to the first limiting step 326 is parallel to the first engagement slope 329. The top wall of the second limiting step 327 forms a first guiding slope 331; and the lower end surface of the second limiting step 327 forms a second engagement slope 332.

Referring to FIGS. 13 and 14, the guiding limiting block 328 is spaced from the second limiting step 327; the guiding limiting block 328 has a body part 333, and the body part 333 extends towards the opening side of the second limiting step 327 to form a guiding part 334; and the shape of the guiding part 334 fits complementarily with the shape of the opening of the second limiting step 327.

Referring to FIG. 14, the guiding part 334 has a second guiding slope 335 and a third guiding slope 336, and the second guiding slope 335 is closer to the first engagement slope 329; the slope of the second guiding slope 335 is greater than that of the third guiding slope 336, and the second guiding slope 335 is concave in the middle along its length direction to form a concave structure; when the movable block 32 moves upward as a whole, the elastic hook 36 is more likely to be deflected to the first limiting step 326 by the second guiding slope 335.

Figure 15:
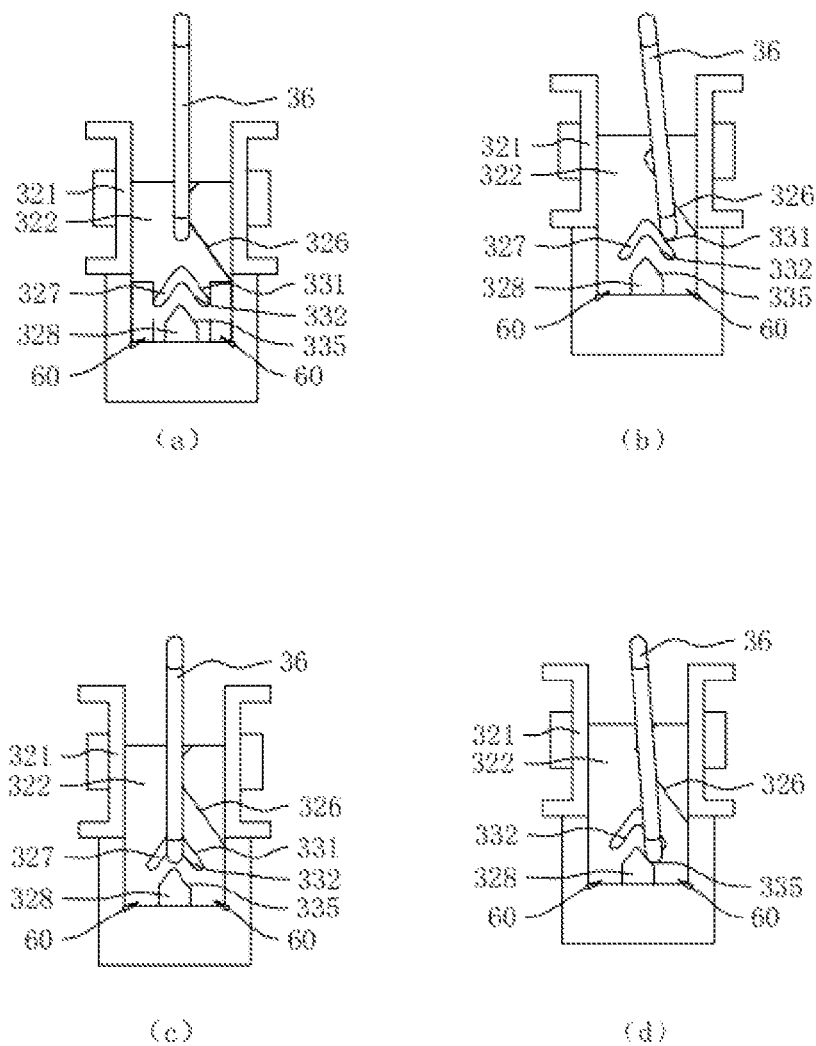
FIG. 15 shows a structural schematic diagram of an elastic hook and a movable block in different states in an embodiment of the present application, in which, (a) of FIG. 15 shows an engagement state of an elastic hook and a movable block when a stop block is in a locked state; (b) of FIG. 15 shows an engagement state of an elastic hook and a movable block when a stop block is switched from a locked state to a to-be-unlocked state; (c) of FIG. 15 shows an engagement state of an elastic hook and a movable block when a stop block is in an unlocked state; (d) of FIG. 15 shows an engagement state of an elastic hook and a movable block during a switching of a stop block from an unlocked state to a locked state.

Referring to FIGS. 15 a, b, c and d, during the movement of the movable block 32, the engagement end 362 is able to be engaged at the first limiting step 326 or at the second limiting step 327. Specifically, as (a) of FIG. 15 shows, when the stop block 20 is in the locked state, the elastic hook 36 is engaged at the first limiting step 326; as (b) of FIG. 15 shows, when the stop block 20 is changed from the locked state to the to-be-unlocked state, the elastic hook 36 is deflected towards one of the switching channels 60 by the guiding effect of the first guiding slope 331, and when the elastic hook 36 moves between the second limiting step 327 and the guiding limiting block 328, the elastic hook 36 swings and resets under elastic potential energy; as (c) of FIG. 15 shows, when the stop block 20 is in the locked state, the elastic hook 36 is engaged at the second limiting step 327; as (d) of FIG. 15 shows, when the stop block 20 is in the to-be-unlocked state, the elastic hook 36 abuts against the guiding limiting block 328.

In some embodiments, the driving unit may also be set to other structures, to achieve the effects of the sliding drives and multi-stage fixings of the movable block 32. Specifically, the first limiting step 326, the second limiting step 327 and the guiding limiting block 328 in the embodiment mentioned above may adopt other shapes; the orientations and angles of the first engagement slope 329, the second engagement slope 332, the first guiding slope 331, the second guiding slope 335 and the third guiding slope 336 are not limited by this embodiment, provided that the guiding and engagement functions of the elastic hook 36 may be realized.

Referring to FIG. 9, in some embodiments, a cushion 70 is connected to the mounting part 11 of the mounting base 10; when the swinging arm 41 is in the contraction state, the cushion 70 abuts against the swinging arm 41; and when the swinging arm 41 is changed from the to-be-contracted state to the contraction state, the swinging arm 41 may be prevented from directly impacting with the mounting part 11 under the action of the resetting member.

The implementing principle is as: the mounting base 10 and the mounting box 31 are fixedly mounted to a balancing scooter or other similar actuators. In the preliminary state, the swinging arm 41 of the auxiliary riding device is in the contraction state, and the stop block 20 is in the locked state. At this time, the swinging arm 41 is separated from the stop block 20, and the elastic hook 36 of the braking mechanism 30 is engaged at the second limiting step 327.

The swinging arm 41 is released by an external force (an electrical drive, manual drive or other mechanical potential energy), to make the swinging arm 41 in the release state; during the release of the swinging arm 41, the swinging arm 41 abuts against the stop block 20 to change the stop block 20 from the unlocked state to the locked state, so that the stop block 20 and the swinging arm 41 are engaged with each other to play a supporting role for a balancing scooter or other similar actuators.

When the swinging arm 41 and the stop block 20 are changed from a separating state to an engagement state, the stop block 20 drives the movable block 32 to move; the movable block 32 moves upward, the elastic hook 36 abuts against the second guiding slope 335 of the guiding limiting block 328, and under the action of the second guiding slope 335, the elastic hook 36 deforms towards the direction of the switching channel 60; and under the elastic potential energy of the resetting spring 35, the elastic hook 36 is engaged at the first limiting step 326 to realize the engagement between the stop block 20 and the swinging arm 41.

The user will apply gravity to the balancing scooter or other similar actuators when getting on the vehicle; the gravity acts on the swinging arm 41 to move the swinging arm 41 to the swinging gap 50; during the swinging of the swinging arm 41, the swinging arm 41 abuts against the stop block 20 to drive the movable block 32 to move. At this time, the stop block 20 is changed from the locked state to the to-be-unblocked state, and then from the to-be-unlocked state to an unlocked state, i.e., the stop block 20 is released from limiting and engagement of the swinging arm 41 and the swinging arm 41 resets under the action of the torsion spring 45, i.e., the swinging arm 41 is changed from the released state to the to-be-contracted state, and then changed from the to-be-contracted state to the contraction state.

When the swinging arm 41 moves towards the swinging gap 50, the second abutting surface 432 of the swinging arm 41 abuts against the first abutting surface 24 of the stop block 20, i.e., the swinging arm 41 pushes the stop block 20 and the movable block 32 to move upward. The elastic hook 36 abuts against the first guiding slope 331 of the second limiting step 327; under the guiding action of the first guiding slope 331, the elastic hook 36 deforms toward a switching channel 60; when the elastic hook 36 moves to the horizontal gap between the second limiting step 327 and the guiding limiting block 328, the elastic hook 36 resets and swings under the action of the elastic potential energy, i.e., when the elastic hook 36 swings into the gap between the second limiting step 327 and the guiding limiting block 328, the elastic hook 36 is able to be engaged with the second engagement slope 332, and the movable block 32 drives the stop block 20 to contract to change the stop block 20 into the unlocked state.

In a second aspect, the present application discloses a balancing scooter.

Figure 16:
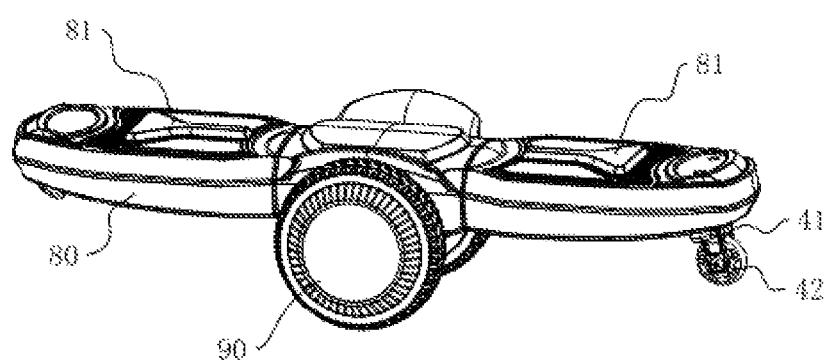
FIG. 16 shows a three-dimensional structural schematic diagram of a balancing scooter in an embodiment of the present application.

Referring to FIG. 16, the balancing scooter includes a frame 80, wheels 90 are provided at the middle of the frame 80 along its length direction; in this embodiment, two wheels are preferably provided. Two pedals 81 are provided on the frame 80 and the two pedals 81 are provided symmetrically about the axis of the +wheels 90; and the auxiliary riding device in the embodiment mentioned above is mounted at the bottom of one of the two pedals, to play an auxiliary riding role when the user gets on the balancing scooter.

Figure 17:
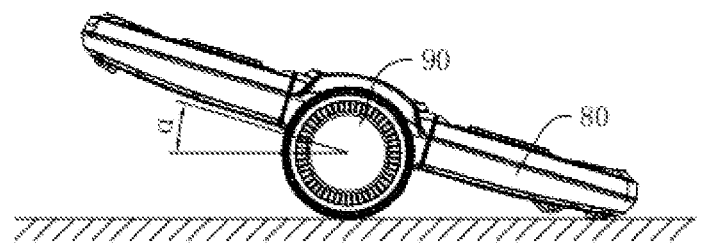
FIG. 17 shows a structural schematic diagram of an auxiliary mechanism of a balancing scooter when the auxiliary mechanism is in a contraction state and the balancing scooter is non-pressed in an embodiment of the present application.

Referring to FIG. 17, when the auxiliary riding device is not used, an angle α is formed between the horizontal plane of the frame 80 and the supporting plane, the user may keep the frame 80 in a relatively horizontal state entirely based on their own balance force; since the deflection degree of the angle α is relatively large, and the overall center of gravity of the user shifts when the user gets on the balancing scooter, it is more difficult for a beginner to get on the balancing scooter.

Figure 18:
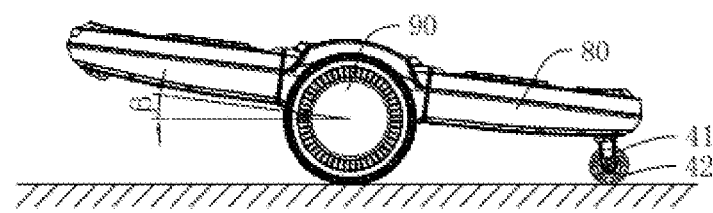
FIG. 18 shows a structural schematic diagram of an auxiliary mechanism of a balancing scooter when the auxiliary mechanism is in a released state and the balancing scooter is non-pressed in an embodiment of the present application.

Referring to FIG. 18, the swinging arm 41 of the auxiliary riding device is opened when the user gets on the balancing scooter, to increase the distance between one of the two pedals and the ground, and at this time, an angle β is formed between the horizontal plane of the frame 80 and the supporting plane. Since the angle β is much smaller than the deflection angle of the angle α, during riding, the swing angle of the balancing scooter from the sloping state to the horizontal state becomes smaller, which may reduce the difficulty of riding.

It should be noted that, since the user's overall center of gravity still remains on the balancing scooter when the user gets off, the automatic contraction of the swinging arm 41 may not aggravate the difficulty of getting off the balancing scooter for the user. On the contrary, the retraction of the swinging arm 41 may avoid the swinging arm 41 from bumping with the protrusions on the ground or on other supporting planes during driving, to ensure smoothness during driving.

In a third aspect, an embodiment of the present application also discloses an auxiliary riding method for a balancing scooter; the auxiliary riding method adopts the balancing scooter in the embodiment mentioned above, and of course it may adopt other similar actuators.

Figure 19:
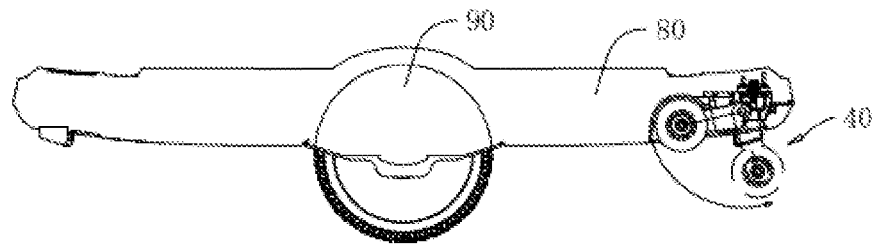
FIG. 19 shows a schematic diagram of displacement states of an auxiliary mechanism of a balancing scooter when the auxiliary mechanism is switched from a contraction state to a released state in an embodiment of the present application.

The auxiliary riding method for the balancing scooter includes the following steps:

Referring to FIG. 19, the swinging arm 41 of the auxiliary mechanism 40 may be rotated using an electric drive or a manual method, to make the swinging arm 41 in the released state for making the auxiliary member 42 contact with the supporting plane, i.e., when the auxiliary member 42 contacts with the supporting plane, the distance between one side of the balancing scooter and the ground increases, the sloping angle of the balancing scooter becomes smaller.

Figure 20:
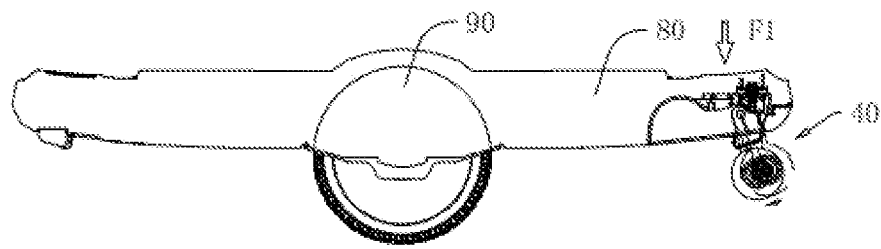
FIG. 20 shows a schematic diagram of displacement states of an auxiliary mechanism of a balancing scooter when the auxiliary mechanism is in a released state under a first pressure in an embodiment of the present application.

Referring to FIG. 20, a first pressure F1 is applied to the swinging arm 41 and the auxiliary member 42, at this time, the user gets on the balancing scooter from the side of the frame 80 configured with the auxiliary riding device and the first pressure F1 is the gravity of the user applied to the frame 80. The swinging arm 41 and the auxiliary member 42 are deflected towards the swinging gap 50 after being subjected to the first pressure F1; the swinging arm 41 is changed from the released state to the to-be-contracted state, and simultaneously, the stop block 20 is changed to the to-be-unlocked state.

Figure 21:
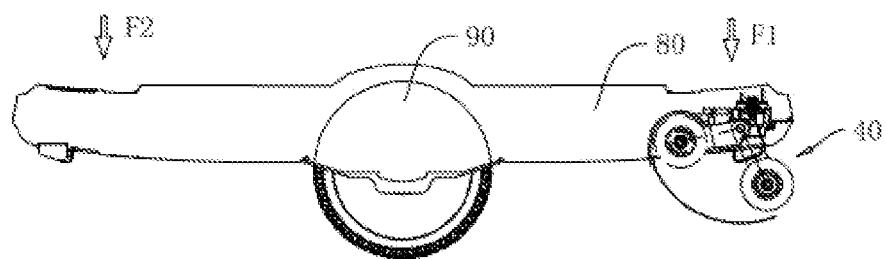
FIG. 21 shows a schematic diagram of displacement states of an auxiliary mechanism of a balancing scooter when the auxiliary mechanism is free from a first pressure in an embodiment of the present application.

Referring to FIG. 21, a second pressure F2 is applied to the other side of the frame 80 where the auxiliary riding device is not mounted.

The first pressure F1 is removed from the swinging arm 41 and the auxiliary member 42, and the user transfers part of gravity to the other side of the frame 80, i.e., the first pressure F1 is not applied to the swinging arm 41 and the auxiliary member 42 and the relatively small deflection degree of the balancing scooter may keep the balance of the balancing scooter. At this time, the swinging arm 41 and the auxiliary member 42 automatically rotate to reset, making the swinging arm 41 is changed from the released state to the contraction state. It may avoid the bumping of the swinging arm 41 and the auxiliary member 42 with the bulges on the ground or other supporting planes, keeping the smooth driving of the balancing scooter.

The above description is only alternative embodiments of the present application and is not intended to limit the protection scope of the present application. Any equivalent structure variations used according to the structures, shapes and principles of the present application should be included within the protection scope of the present application.

What is claimed is:

1. An auxiliary riding device, comprising:
a mounting base, which is provided to be connected with a balancing scooter;
a stop block, which is slidably provided on the mounting base; wherein an engagement notch is provided on the stop block, and the stop block has a locked state and an unlocked state on the mounting base;
a braking mechanism, which is provided to be connected with the balancing scooter; wherein the braking mechanism has a connecting block; the connecting block is connected with the stop block for driving the stop block to move such that the stop block is switched between the locked state and the unlocked state; and
an auxiliary mechanism, comprising a swinging arm rotatably connected to the mounting base and an auxiliary member connected to the swinging arm; wherein an engagement step groove that is configured to fit with the engagement notch is provided on the swinging arm, and the swinging arm has a released state and a contraction state;
wherein the locked state of the stop block is configured for keeping the swinging arm in the released state such that the auxiliary member acts as an auxiliary support for the balancing scooter; when the swinging arm is switched from the released state to the contraction state, the swinging arm simultaneously drives the stop block to be switched from the locked state to the unlocked state.

2. The auxiliary riding device according to claim 1, wherein the mounting base has a rotation supporting part; the swinging arm is rotatably connected to the rotation supporting part; and the rotation supporting part has a first sloping surface and a second sloping surface;
when the swinging arm is in the contraction state, the swinging arm is adjacent to the first sloping surface;
when the swinging arm is in the released state, the swinging arm is adjacent to the second sloping surface, and a swinging gap is provided between the swinging arm and the second sloping surface for swinging of the swinging arm; when the swinging arm abuts against the second sloping surface, the swinging arm triggers the braking mechanism to put the stop block in a to-be-unlocked state.

3. The auxiliary riding device according to claim 2, wherein the stop block has a first abutting surface; the engagement step groove has an engagement surface and a second abutting surface; when the stop block is in the locked state, the first abutting surface abuts against the second abutting surface so that when the swinging arm moves towards the swinging gap, the swinging arm drives the stop block to move by means of the second abutting surface.

4. The auxiliary riding device according to claim 3, wherein a resetting member is provided at a joint between the swinging arm and the rotation supporting part for switching the swinging arm from the released state to the contraction state.

5. The auxiliary riding device according to claim 4, wherein a spindle is provided on the mounting base; the swinging arm is rotatably connected to the mounting base by the spindle; the resetting member is provided as a torsion spring; the torsion spring has a first end and a second end; and the torsion spring is sleeved on the spindle;
a placing groove and a notch are provided on the swinging arm; the torsion spring is placed in the placing groove; a limiting groove is provided on the rotation supporting part; the first end is engaged with the placing groove; the second end extends into the limiting groove through the notch; when the swinging arm is in the contraction state, the torsion spring is in a non-stressed state.

6. The auxiliary riding device according to claim 2, wherein the braking mechanism comprises:
a mounting box, which is mounted on the balancing scooter; and an opening is provided on one side of the mounting box;
a movable block, which is slidably provided in the mounting box; the movable block has a connecting part, a locking part, a resetting part and a buckling part; the connecting part is slidably connected to an inner wall of the mounting box; the buckling part passes through the opening and extends to an outer side of the mounting box; a second connecting block is connected to the buckling part; and the connecting block is fixedly connected to the stop block;
a resetting spring, wherein an end of the resetting spring abuts against the inner wall of the mounting box, and a second end of the resetting spring abuts against the resetting part; and
an elastic hook, wherein the elastic hook has a fixing end and an engagement end, the fixing end is fixed in the mounting box; and the engagement end is engaged with the locking part.

7. The auxiliary riding device according to claim 6, wherein the locking part is provided with a first limiting step, a second limiting step and a guiding limiting block sequentially along a vertical direction;
the first limiting step has a first engagement slope and the first engagement slope extends to a side of the connecting part;

the second limiting step has a first guiding slope and a second engagement slope;

the guiding limiting block has a second guiding slope;

a switching channel is provided between the second limiting step and the guiding limiting block and between the second limiting step and the connecting part for moving of the elastic hook therein, such that the elastic hook is engaged with the first limiting step and the second limiting step respectively through the switching channel under actions of the first engagement slope, the first guiding slope, the second engagement slope and the second guiding slope.

8. The auxiliary riding device according to claim 1, wherein the auxiliary member is an auxiliary wheel; the auxiliary wheel is rotatably connected to the swinging arm such that the swinging arm abuts against ground when the swinging arm is in the released state.

9. The auxiliary riding device according to claim 1, wherein a cushion is connected to the mounting base; when the swinging arm is in the contraction state, the cushion abuts against the swinging arm.

10. A balancing scooter, comprising:

a frame;

a wheel, which is rotatably connected to a middle position of the frame along a length direction of the frame; and the auxiliary riding device according to claim 1, which is connected to a bottom of the frame.

11. An auxiliary riding method for the balancing scooter according to claim 10, comprising:

rotating the swinging arm to put the swinging arm in the released state such that the auxiliary member contacts with a supporting plane;

applying a first pressure to a side of the frame such that the first pressure is applied to the swinging arm and the auxiliary member;

applying a second pressure to a second side of the frame; and releasing the first pressure from the swinging arm and the auxiliary member to switch the swinging arm from the released state to the contraction state.

\* \* \* \* \*